Dec. 28, 1954   E. H. RUSH   2,698,363
PIPE LINE INDICATOR FOR SCRAPERS
Filed Nov. 12, 1953

Inventor:
ELMER H. RUSH
By A. H. McCarthy
His Agent

United States Patent Office 2,698,363
Patented Dec. 28, 1954

2,698,363

PIPE LINE INDICATOR FOR SCRAPERS

Elmer H. Rush, Hammond, Ind., assignor to Shell Development Company, New York, N. Y., a corporation of Delaware Application November 12, 1953, Serial No. 391,624

3 Claims. (Cl. 200—61.41)

This invention relates to apparatus for use with pipelines and pertains more particularly to an indicator adapted to be mounted in a pipeline for indicating the passage of an element, such as a pipeline scraper, by the indicator.

Pipeline scrapers, also known as "go-devils," are commonly used in pipelines for various purposes. For example, a pipeline which handles various materials such as gasoline, fuel oil, and other petroleum products, may use a scraper either to clean the inner surface of the pipe or to separate different tenders of petroleum products as they pass through the line. Since a number of pumping stations are normally positioned along a pipeline, a scraper cannot be pumped from one end of the line to the other, but only to the next pumping station, at which place it is removed from the line and another scraper is inserted into the outgoing line downstream of the pumping station.

As a scraper approaches a pumping station, it is caught in a trap in the line in a manner well known to the art, while the fluid in the line is by-passed around the trap and through the pump. Since it is desirable to know when the scraper has arrived in the trap, various types of indicator means may be used to indicate the arrival of the scraper.

Scraper indicator means are also used in other installations, such as those used to calibrate flowmeters as described in the copending patent application, Serial No. 374,945, filed August 18, 1953, and entitled, "Method and Apparatus for Calibrating Flowmeters." In this method of calibrating flowmeters, a pipeline scraper is passed through the pipeline for a predetermined distance, say, one mile, and the volume of fluid passing through the flowmeter is compared to the calculated amount of fluid in that section of pipeline. Pipeline scraper indicators are employed at the beginning and end of this test section of pipeline to indicate when the scraper has started and finished its travel.

Several types of mechanically-actuated pipeline scraper indicators have been tested without finding one which would operate satisfactorily under high pipeline pressures. A common type of scraper indicator comprises a finger which depends vertically within the bore of the pipeline from a horizontal shaft extending through the wall of a housing positioned above the pipeline and in fluid communication therewith. In an attempt to prevent the leakage of oil from the pipeline and housing outwardly around the horizontal shaft, various types of seals have been employed to pack-off the shaft. While normal packing materials have proved suitable for pipelines handling fluids under low pressure, they have been generally inadequate when an attempt was made to handle fluids under high pressure.

It is, therefore, a primary object of this invention to provide an indicating device adapted to be mounted on a pipeline for indicating the arrival or passage of a scraper at a predetermined point in the pipeline.

A further object of the present invention is to provide a packless pipeline scraper indicator having positive sealing means to prevent any leakage of fluid from the pipeline through the indicator.

Another object of this invention is to provide a mechanically-actuated scraper indicator of a simple design in which no packing is employed to seal the elements of the indicator which extend through the wall of the pipeline.

These and other objects of this invention will be understood from the following description taken with reference to the attached drawing, wherein.

Figure 1:
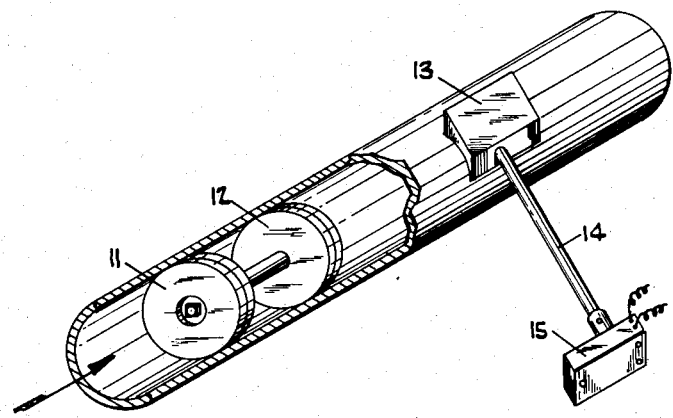
Figure 1 is an isometric view, partly in cross-section, of the present scraper indicator mounted on a pipeline through which a scraper is being propelled.

Referring to Figure 1 of the drawing, a pipeline scraper 11 is diagrammatically illustrated as being propelled through a pipeline 12, by means of the liquid flowing through said pipeline. Fixedly secured to the top of the pipeline 12 is the scraper indicator housing 13 which is provided with a horizontally extending arm 14. A switch box 15 is secured to the end of the arm 14 and contains a suitable type of switch, as will be explained hereinbelow.

Figure 2:
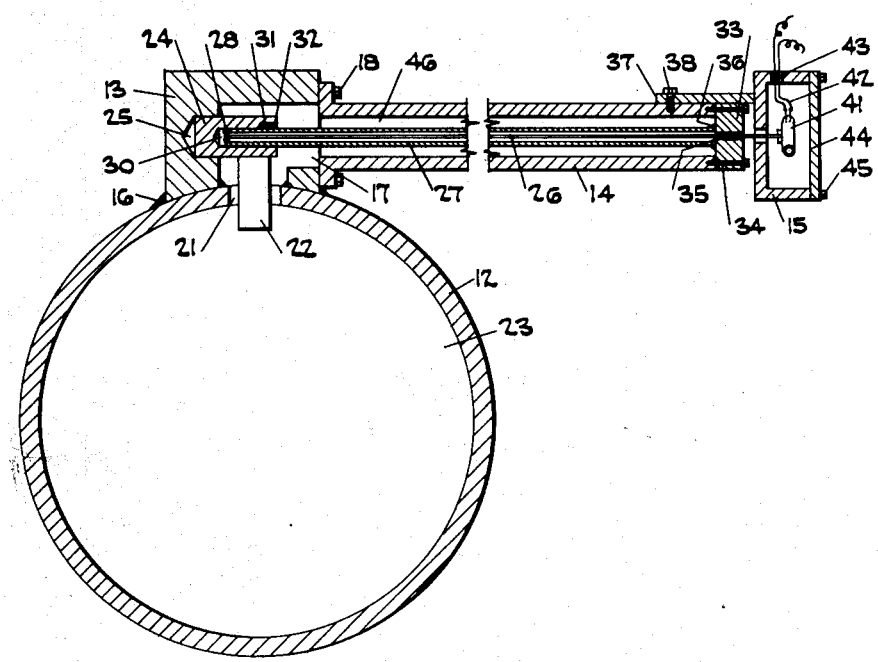
Figure 2 is a diagrammatic view in cross-section of the present scraper indicator mounted on the pipeline.

As shown in Figure 2 of the drawing, the indicator housing 13 is secured to the pipeline 12 in a fluidtight manner, as by welding at 16 around the base of the housing 13. One side of the housing is provided with an opening 17 over which the tubular housing arm 14 may be secured in a suitable fluidtight manner as by bolts 18.

Directly beneath the housing 13, the pipeline 12 is provided with an opening 21 through which a downwardly extending finger or contact member 22 extends into the bore 23 of the pipeline 12. The finger 22 is fixedly secured to a cylindrical member or shaft 24 which is rotatably mounted in a bearing or recess 25 in the wall of the housing 13.

Extending through the hollow housing arm 14 is a torque tube which comprises the rod member 26 concentrically positioned within a tubular member 27, the rod 26 and tubular member 27 being fixedly secured together at one end by any suitable means, as by welding at 28.

While the welded end of the torque tube 26—27 may be fixedly or removably secured to the shaft 24 of the finger element 22, for ease of assembly the shaft 24 is preferably provided with a recess 30 into which the end of the torque tube 26—27 may be received. Rotation of the shaft 27 within the recess 30 is prevented by providing the shaft 27 with a key 31 adapted to slide horizontally in a keyway 32 which is formed in the shaft 24.

The open, outwardly-extending end of the housing arm 14 may be closed by any suitable closure member or plug 33 which is preferably removably secured to the arm 14, as by one or more screws 34. The rod 26 of the torque tube extends through a central hole 35 in the plug 33 while the end of the tubular member 27 adjacent the plug 33 is fixedly secured in any suitable fluidtight manner to the plug 33, as by welding at 36. The switch housing 15 may be attached to housing 14 by means of a bracket arm 37 adapted to be affixed to the housing arm 14 by means of a screw 38.

The switch housing 15 contains an electrical switch 41 which is affixed to the end of the rod 26 extending into the housing 15 so as to be actuated by the rotational movement of said rod 26. It is realized that various types of electrical switches may be employed, with the rod 26 either actuating the entire switch, such as one of the mercury tilting tube type, as illustrated, or by actuating a movable element of switches of other types through a cam, lever or other mechanical device. The switch 41 may be secured to the end of the rod 26 in any suitable manner, as by clamping or soldering. The electrical leads 42 coming from the switch 41 are provided with sufficient slack to allow the switch to move within the housing 15. The leads 42 then pass outwardly through an insulated portion 43 of said housing 15 and may be connected into any suitable electric circuit, not shown. The back of the switch box 15 is provided with a removal cover 44 which may be attached to the box as by means of bolts 45.

In operation, a pipeline scraper 11 (Figure 1) being propelled along the pipeline 12 contacts the downwardly extending finger 22 of the indicator device when the scraper passes the finger. The finger 22 rotates on its shaft 24 until the lower end of the finger 22 is raised into the slot 21 in the pipeline 12. Rotation of the shaft 24 causes a like rotation of the end of the tubular member 27 which is keyed to the shaft 24 at 31. Since one end of the rod member 26 is welded at 28 to the tubular member 27, while the other end thereof is free, said rod will rotate throughout its length whenever the finger 22, shaft 24 and tubular member 27 are rotated. The rotation of the rod member 26 throughout its length causes the switch means 41, attached to the end of the rod 26 within the switch box 15, to be actuated so as to close or to open an electrical circuit.

Since the end of the tubular member 27 extending outside the indicator housing 13 is welded to the plug 33 fixedly attached to the housing arm 14, there is no movement of this end of the tubular member 27 when the finger 22 of the indicator device is actuated by a pipeline scraper passing through the pipeline 12. However, the tubular member 27 is constructed of a metal or material of sufficient flexibility and thickness to permit the tubular member 27 to be twisted within its elastic limits when torque is applied to the end of the tubular member, keyed to the shaft 24 of the finger 22. Due to this construction of the present indicator device, no spring means are needed to return the finger to its normal position within the bore of the pipeline 12 after the scraper has passed.

During operation, fluid from the pipeline 12 will enter through slot 21 to fill the indicator housing 13 and its horizontal arm 14 in the annular space 46 around the tubular member 27. Since the plug 33 closes the end of the horizontal arm 14 in a fluidtight manner and welds 28 and 36 are provided at either end of the tubular member 27, fluid from the pipeline under pressure is contained within the housing 13 and horizontal arm 14 while the actuating rod member 26 to the electrical switch means 41 extend outside the housing 13 and arm 14 without the necessity of employing any packing material to seal around the rod 26 against leakage of fluid.

When the present pipeline scraper indicator is used on pipelines through which fluid is being pumped at high rates of flow, the torsional elasticity of the tubular member 27 and the size tubular member 27 should be of a value and the finger 22 should be of a size sufficient to prevent the force of the fluid stream passing through the pipeline from twisting the rod member 26 prematurely and actuating the switch 41. Thus, the length and cross-sectional area of the finger 22 that is presented to the flowing stream may be varied for various pumping conditions. Due to the action of the tubular member 27 in returning the finger 22 to its normal position, it may be seen that the present indicator device need not be necessarily positioned above a slot 21 in the top of a pipeline 12, but may also be positioned over a slot in the pipeline which may be formed in the bottom or side of the pipeline 12.

I claim as my invention:

1. A pipeline scraper indicator device adapted to be positioned in a fluidtight manner over an opening in a pipeline, said indicator device comprising a housing secured in a fluidtight manner to the outside of the pipeline over said opening, a hollow arm extending from said housing and closed at its extended end, a contact finger pivotally mounted within said housing for movement in a plane parallel to the axis of said pipeline, one end of said contact finger extending through the opening and into the bore of said pipeline, an elongated tubular member extending through said hollow arm and fixedly secured at one end to said contact finger and at the other end to said closed end of said hollow arm, rod means fixedly secured at one end to the finger end of said tubular member and extending through said tubular member and the closed end of the hollow arm to a point outside said arm, and electrical switch means mounted adjacent the extended end of said rod means for actuation by the rotational movement of said rod means.

2. A pipeline scraper indicator device adapted to be positioned in a fluidtight manner over an opening in a pipeline, said indicator device comprising a housing secured in a fluidtight manner to the outside of the pipeline over said opening, a hollow arm extending from said housing, plate means affixed in a fluidtight manner to extended end of said hollow arm, said plate means having an opening therethrough concentric with the axis of said arm, a contact finger pivotally mounted within said housing for movement in a plane parallel to the axis of said pipeline, one end of said contact finger extending through the pipeline opening and into the bore of said pipeline, an elongated tubular member extending through said hollow arm and fixedly secured at one end to said contact finger and secured in a fluidtight manner at the other end around the axial opening in the plate means closing the hollow arm, rod means fixedly secured at one end to the finger end of said tubular member in a fluidtight manner and extending through said tubular member and the axial opening in the plate means at the closed end of the hollow arm to a point outside said arm, and electrical switch means mounted adjacent the extended end of said rod means for actuation by the rotational movement of said rod means.

3. A pipeline scraper indicator device adapted to be positioned in a fluidtight manner over an opening in a pipeline, said indicator device comprising a housing secured in a fluidtight manner to the outside of the pipeline over said opening, a hollow arm extending from said housing, plate means affixed in a fluidtight manner to extended end of said hollow arm, said plate means having an opening therethrough concentric with the axis of said arm, a contact finger pivotally mounted within said housing for movement in a plane parallel to the axis of said pipeline, one end of said contact finger extending through the pipeline opening and into the bore of said pipeline, an elongated tubular member extending through said hollow arm and fixedly secured at one end to said contact finger and secured in a fluidtight manner at the other end around the axial opening in the plate means closing the hollow arm, rod means fixedly secured at one end to the finger end of said tubular member in a fluidtight manner and extending through said tubular member and the axial opening in the plate means at the closed end of the hollow arm to a point outside said arm, and mercury-type electrical switch means clamped to the extended end of said rod means for actuation by the rotational movement of said rod means.

No references cited.